Aug. 11, 1953 A. M. PERRIN 2,648,425
DISCHARGING APPARATUS
Filed May 23, 1946 3 Sheets-Sheet 1

Aug. 11, 1953    A. M. PERRIN    2,648,425
DISCHARGING APPARATUS
Filed May 23, 1946    3 Sheets-Sheet 3
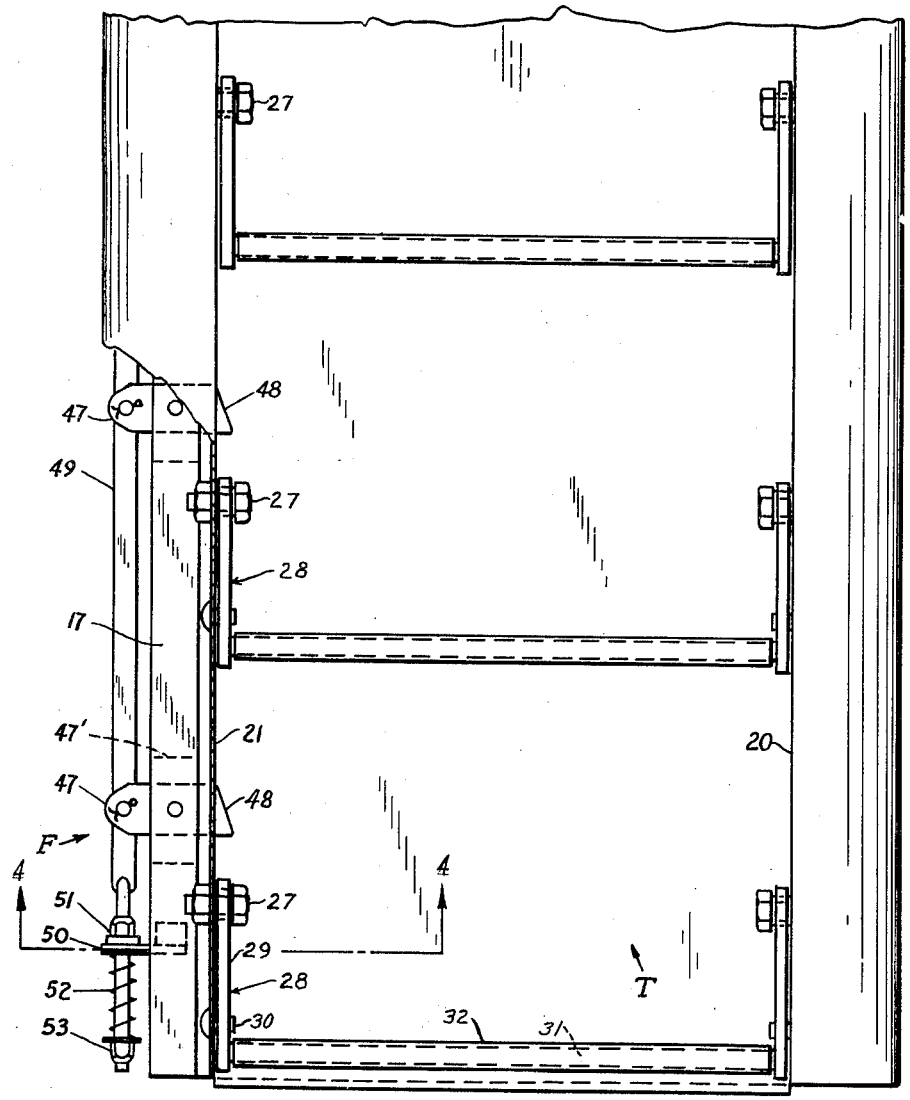
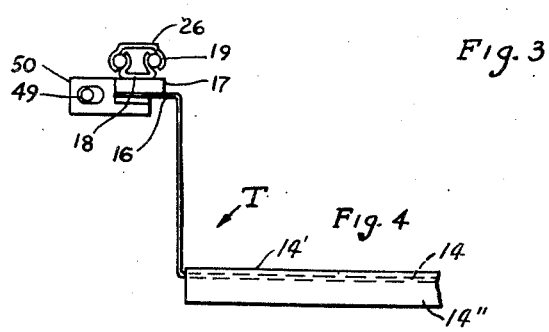
INVENTOR.
BY Arthur M. Perrin
Paul M. Gist Patented Aug. 11, 1953

2,648,425

UNITED STATES PATENT OFFICE 2,648,425

DISCHARGING APPARATUS

Arthur M. Perrin, New York, N. Y.

Application May 23, 1946, Serial No. 671,863

9 Claims. (Cl. 198—224)

This invention relates to the art of material handling, and particularly to a portable discharging or conveying device including a reciprocating, multiple-blade type conveyor.

Objects of the invention include the provision of a portable power-operated discharging or conveying device; the provision of such discharging or conveying device in which a multiple-blade reciprocating unit is used to advance the material being handled; the provision of such a portable discharging or conveying device of limited length and of such design that a plurality can be used in tandem when conveying equipment of relatively great length is required; the provision of such a multiple-blade reciprocating unit in which the blades are feathered during a portion of its non-advancing stroke; the provision of such a multiple-blade reciprocating unit in which the separate blades are yieldably mounted so that they can individually yield in the event they encounter a positive obstruction; and the provision of a portable discharging device including all of the above-listed features in combination.

The above, as well as other objects and novel features of the discharging or conveying device, will become apparent from the following specification and accompanying drawings, in which:

Figure 3 is a top plan view of a portion of the apparatus shown in Figures 1 and 2;

Figure 4 is a view taken along line 4—4 of Figure 3; and

Figure 5 is an enlarged view of a portion of the apparatus shown in Figure 1.

Figure 1:
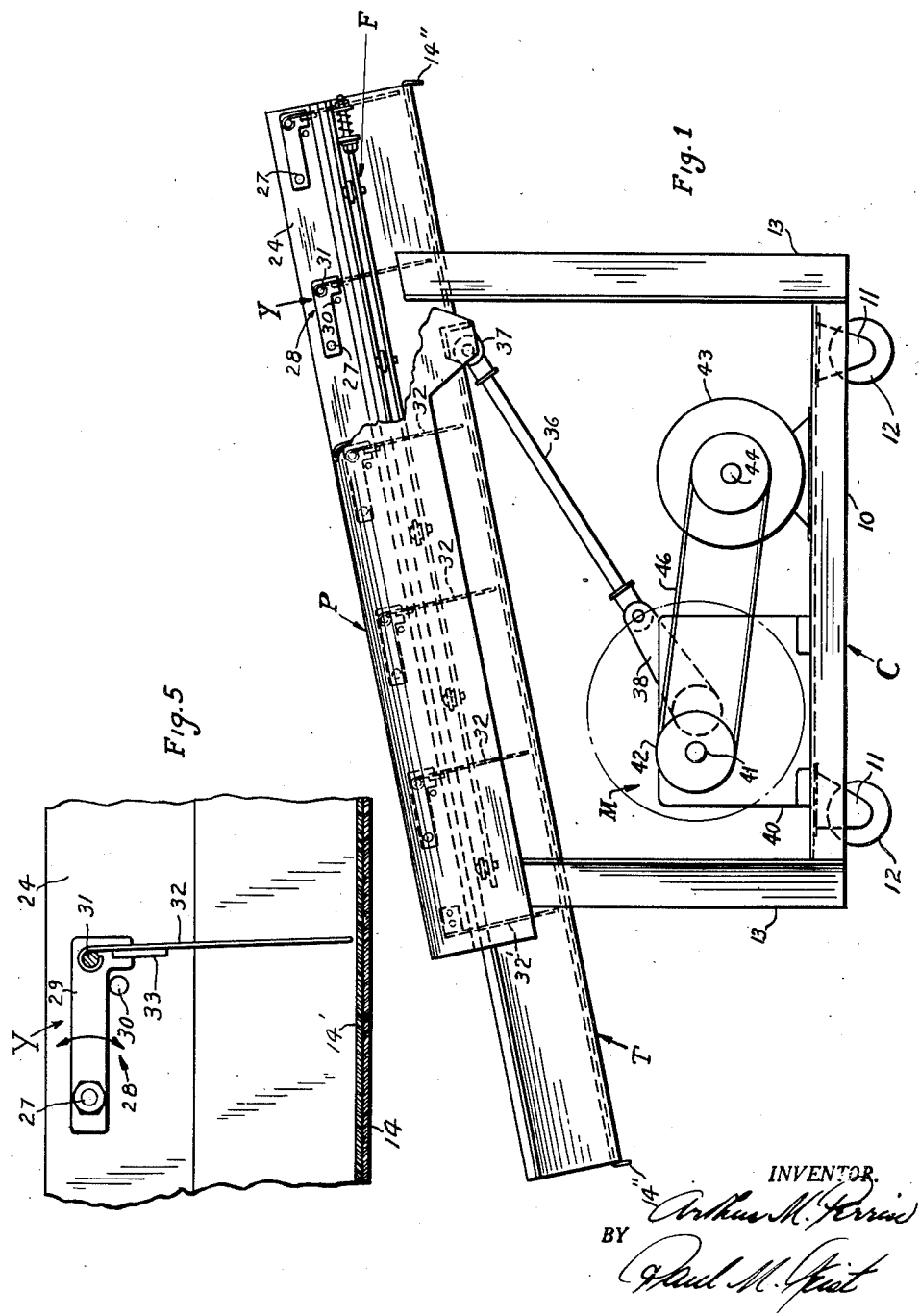
Figure 1 is a side elevational view of apparatus to which the principles of the invention have been applied.

Referring to Figure 1 of the drawings, the principles of the invention are shown as applied to a portable self-contained discharging or conveying apparatus comprising a carriage C that supports a trough T adapted to convey the material to be handled. In the embodiment disclosed, the trough T is shown as inclined upwardly, which permits draining of liquid from the material being conveyed. It is understood, of course, that the trough T may be horizontal or inclined downwardly, depending upon the nature of the work to be accomplished. A multi-blade pusher P is mounted within trough T for reciprocation by a power driven crank mechanism M mounted on the carriage C. Yieldable mechanism Y (Fig. 5) is provided for each blade except one (which will be described later) of the pusher P which mechanism functions, upon a blade encountering a positive obstruction during its material-advancing stroke, to cause the obstructed blade to yield without breaking and without affecting the normal operation of all other blades. Feathering mechanism F (Fig. 3) is provided for each blade of the pusher P to which said yieldable mechanism Y is applied. It functions during the non-advancing stroke of the pusher and maintains the blades to which it is applied out of contact with the material being handled during the latter part of said non-advancing stroke.

Figure 2:
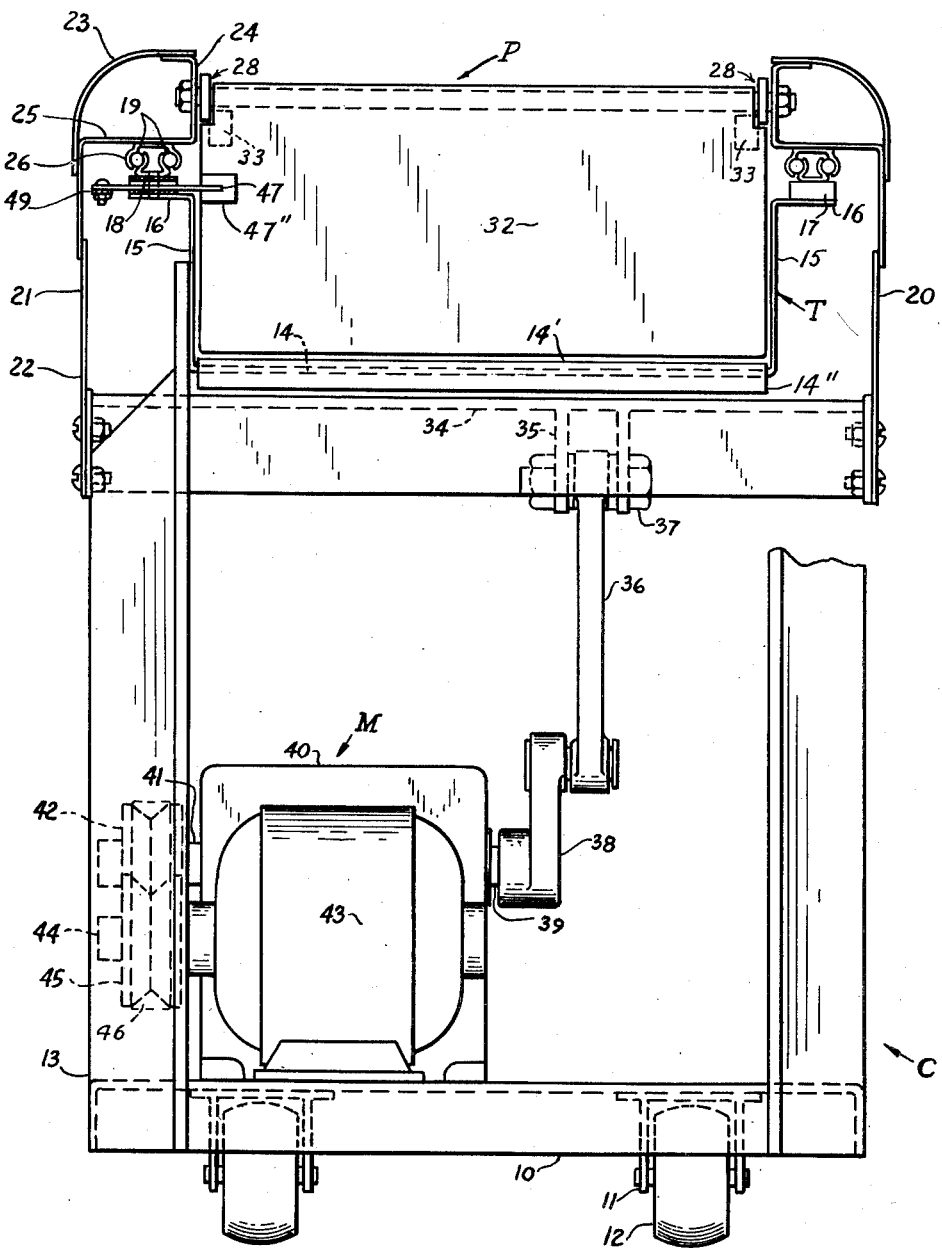
Figure 2 is a front elevational view of the apparatus disclosed in Figure 1, with the upper portion horizontal (for clarity) rather than inclined as shown in Figure 1.

Referring to Figures 1 and 2, the carriage C comprises a floor 10 to which four yoke members 11 are attached, each of which supports a roller 12. The front yokes are rigid, while the rear ones are swiveled so that the carriage can be moved from place to place with ease. Each corner of the floor 10 is provided with an upright 13, preferably formed from angle bars of T-section. In the present embodiment, the uprights 13 at the front of the carriage are higher than those at the rear so that the trough T can be supported at an inclination.

The trough T comprises a generally U-shaped member including a base 14, sides 15 and flanges 16. The non-flanged faces of the uprights 13 are welded, or otherwise fastened to the sides 15 of the trough T, forming with the carriage C a rigid structure capable of withstanding the rigorous treatment to which industrial conveyors are subjected. A wear plate 14' is removably applied to the base 14 of trough T. Each end of plate 14' is provided with a lip portion 14" for holding it in place and providing a drip edge for draining liquid mixed with the material being handled. The flanges 16 of the trough T rigidly support track members 17, to which channel-shaped members 18 are fixed. The members 18 are generally U-shaped, each leg of which forms the inner raceway for anti-friction balls 19 that in turn support the pusher P.

The pusher P comprises a pair of right and left frame members 20 and 21. Since these members are identical except reversed one to the other, only the left-hand member 21 will be described in detail. The frame member 21 is made up of sheet metal stock, the length of the sections of which equals the length of the pusher P. These lengths of sheet metal are fabricated so that upon assembly the frame member 21 is provided with a skirt portion 22 and a hollow reenforcing section 23 having right-angularly arranged walls 24 and 25.

The wall 25 is provided with an inverted, generally U-shaped channel member 26, the depending legs of which form outer races for the balls 19. Accordingly, the frame members 20 and 21 are supported for free anti-friction motion along the flanges 16 of the trough T.

The wall 24 of the frame 21 is provided with a plurality of equally-spaced pivot pins 27 (Fig. 3) that are in alignment with identical pivot pins, equally spaced along the corresponding wall of member 20. Supporting frames 28 having legs 29 are pivotally mounted on the pins 27. Stop pins 30 are attached to the walls 24 of the frames 20, 21 in position adjacent the legs 29 so that the supports 28 are prevented from descending by gravity below the elevation of the arcuate portions 23 of the frames 20, 21.

Referring to Figure 5, the legs 29 of each support 28 are joined by a rod 31. A pusher plate 32 has its upper end bent around the rod 31 so that the plate 32 can freely pivot on said rod.

The plate 32 extends longitudinally between the walls 15, and transversely to the bottom of the trough T. An abutment member 33, integral with one of the legs 29 of each support 28, extends outwardly into the arcuate path of movement of plate 32 and engages it just below the pivot rod 31. This arrangement prevents the plate 32 from moving clockwise beyond the vertical position (Figs. 5 and 1), but permits counter-clockwise movement from said position.

Referring to Figure 2, the lower end of each of the frames 20, 21 is rigidly attached to a plate 34, which with the supports 28 form a rigid structure that is adapted to be reciprocated along the flanges 16 of the trough T. The plate 34 includes a depending yoke member 35 that receives one end of a drawbar 36, which latter is pivotally mounted to the yoke 35 by a bolt 37. The opposite end of drawbar 36 is connected to the free end of a crank 38 that is attached to the driven shaft 39 of a speed-reduction unit 40 mounted on the floor 10 of carriage C. The unit 40 includes a driven shaft 41 supporting V-pulley 42. A motor 43, also mounted on the floor 10 of carriage C, has a driving shaft 44 which supports a similar V-pulley 45 aligned with pulley 42. A V-belt 46 extends between pulleys 42 and 45 for transmitting power from the motor 43 to the speed-reduction unit 40.

From the foregoing, it is evident that energization of motor 43 causes the speed-reduction unit 40 to revolve crank 38 at a predetermined speed, thereby to reciprocate the pusher P forwardly and backwardly. Near the middle of the non-advancing stroke of pusher P, the feathering mechanism F becomes effective to raise all of the plates 32 (except the rear end one) to, and maintain them out of contact with the material being handled throughout the remainder of the return or non-advancing stroke of the pusher P.

Referring to Figure 3, the feathering mechanism F includes a plurality of links 47, one for each of the frames 28 and equally spaced along the flange 16 of the trough T. Each of the links 47 extends through an elongated slot 47' in the member 17 of support 20 and is pivotally attached to the flange 16 at a point such that it cooperates with a plate 32 at about the middle of the non-advancing stroke of the pusher P and remains in cooperation with said plate substantially throughout the remainder of said rearward or non-advancing stroke of said pusher. A pad 47'', Fig. 2, is provided on each plate 32 to prevent excessive wear of the plate due to the action of link 47 thereon. Each link 47 is provided with an inclined surface 48, and the end of each link opposite its inclined surface 48 is pivoted to a drawbar 49. The one end of drawbar 49 is threaded and extends through an opening in a supporting bracket 50 rigid with the flange 16 of trough T. An adjusting nut 51 is provided on the one side of bracket 50, while a compression spring 52 surrounds the threaded end of bar 49 and engages the other side of bracket 50. A nut 53 is finally threaded onto the end of bar 49 such that spring 52 is given a pre-load of sufficient value tending to maintain the links 47 in the position shown in Figure 3.

As the pusher P moves forwardly during its material-advancing stroke, each plate 32 engages the inclined surface 48 of its corresponding link 47, pivoting said link against the resistance of spring 52 sufficiently to permit the plates 32 to pass their links 47. Near the middle of the non-advancing stroke of pusher P, the plates 32 tend to pivot their links 47 in a counter-clockwise direction (Fig. 3) about their pivots, but nut 51 and bracket 50 resist such motion of links 47. Consequently, plates 32 are themselves pivoted about their rods 31 into a plane above the material being handled. They are maintained in said plane until near the end of the non-advancing stroke of pusher P, at which time the outer free ends of plates 32 pass beyond the influence of links 47 at which point they gravitate into position in preparation for the succeeding material-advancing stroke.

Should any of the plates 32 in pivoting downwardly about pivot 31 at the end of a non-advancing stroke of the pusher P encounter a positive obstruction such that upon the next advancing stroke of the pusher P there would be a tendency to buckle the plate 32 or spring the section 23, the plate 32 and its frame 28 will pivot about the frame's pivot 27, thereby avoiding damage to the apparatus. When such obstruction has been removed or discharged from the conveyor, the frame 28 and its plate immediately becomes effective to further advance the material being handled.

Referring to Fig. 1, the rearmost plate 32' of pusher P is rigidly attached to the walls 24 so that it is incapable of being feathered and its mounting is incapable of pivotal action. The plate 32' is preferably provided with a plurality of holes which permit any liquid contained with the material being conveyed or discharged to drain therefrom. Usually, the lower compartment shown in Fig. 1, of pusher P, formed by the plate 32' and the next adjacent plate 32, is located beneath a discharging outlet of a machine tool or the like, with the lower end of trough T located in a position to drain into the sump of the machine producing the material to be discharged. The rigid plate 32' prevents the discharged material from falling into and contaminating the liquid in the sump.

Although the various features of the new and improved discharging device have been shown and described in detail to fully disclose one embodiment of the invention, it will be evident that numerous changes may be made in such details and certain features may be used without others, without departing from the principles of the invention.

What is claimed is:

1. Apparatus comprising in combination, a portable carriage; a frame on said carriage; a trough stationarily attached to said frame; a pusher frame adapted to be reciprocated relatively to said trough; power-operated crank mechanism on said carriage; means connecting said crank mechanism to said pusher frame for causing said pusher frame to be reciprocated when said crank mechanism is operated; a plurality of substantially equally-spaced pusher members attached to said pusher frame; means for maintaining said pusher members in material-advancing position during the one stroke of said frame; and individual means for each pusher member, separate from said reciprocating means, independent of the material being handled and effective incident to the non-advancing stoke of said frame for feathering said pusher members to material-disengaging position during the other stroke of said frame.

2. Apparatus comprising in combination; a trough adapted to convey material; a frame adapted to be reciprocated relatively to said trough; means for reciprocating said frame; a plurality of substantially equally-spaced pusher members attached to said frame; means for maintaining said pusher members in material-engaging position during the advancing stroke of said frame; and a plurality of means, one for each of said pusher members associated with said trough and adapted to freely pass its corresponding pusher member during the material-advancing stroke of said frame, and to elevate its corresponding pusher member out of material-engaging position during the non-advancing stroke of said frame.

3. Apparatus comprising in combination, a trough adapted to convey material; a frame adapted to be reciprocated relatively to said trough; means for reciprocating said frame; a plurality of substantially equally-spaced pusher members attached to said frame; means for maintaining said pusher members in material-engaging position during the advancing stroke of said frame; a plurality of pivotally-mounted links mounted on said frame, each extending into the path of travel of one of said pusher members; abutment means preventing the pivoting of said links in one direction; and resilient means adapted to be compressed when said links are pivoted in the other direction.

4. Apparatus comprising in combination, a trough adapted to convey material; a frame adapted to be reciprocated relatively to said trough; means for reciprocating said frame; a plurality of substantially equally-spaced pusher members attached to said frame; means for maintaining said pusher members in material-engaging position during the advancing stroke of said frame; a plurality of pivotally-mounted links mounted on said frame, each extending into the path of travel of one of said pusher members; a rod attached to all of said links; and a spring normally urging said rod against a rigid abutment to prevent the pivoting of said links during the non-advancing stroke of said frame.

5. Apparatus comprising in combination, a trough adapted to convey material; a frame adapted to be reciprocated relatively to said trough; a plurality of substantially equally-spaced supporting members pivoted to said frame; a plate, the area of which is at least substantially equal to the cross-section of said trough, pivoted to each of said supporting members; a plurality of links mounted on said frame, each extending into the path of travel of one of said plates; abutment means preventing the pivoting of said links in one direction; and resilient means adapted to be compressed when said links are pivoted in the other direction.

6. Apparatus comprising in combination, a trough adapted to convey material; a frame adapted to be reciprocated relatively to said trough; a plurality of substantially equally-spaced supporting members pivoted to said frame; a plate, the area of which is at least substantially equal to the cross-section of said trough, pivoted to each of said supporting members; a plurality of pivotally-mounted links mounted on said frame, each extending into the path of travel of one of said plates; a rod attached to all of said links; and a spring normally urging said rod against a rigid abutment to prevent the pivoting of said links during the non-advancing stroke of said frame.

7. Apparatus comprising in combination, a portable carriage; a trough stationarily associated with said carriage; a frame adapted to be reciprocated relatively to said trough; a plurality of substantially equally-spaced supporting members pivoted to said frame; a plate adapted to extend downwardly into said trough and pivoted to each of said supporting members; a plurality of links mounted on said frame, each extending into the path of travel of one of said plates; abutment means preventing the pivoting of said links in one direction; and resilient means adapted to be compressed when said links are pivoted in the other direction.

8. Apparatus comprising in combination, a portable carriage; a trough stationarily associated with said carriage; a frame adapted to be reciprocated relatively to said trough; a plurality of substantially equally-spaced supporting members pivoted to said frame; a plate adapted to extend downwardly into said trough and pivoted to each of said supporting members; a plurality of pivotally-mounted links mounted on said frame, each extending into the path of travel of one of said plates; a rod attached to all of said links; and a spring normally urging said rod against a rigid abutment to prevent the pivoting of said links during the non-advancing stroke of said frame.

9. In a material-handling device having a conveying trough and a reciprocable pusher having a plurality of pivoted plates extending into said trough, the combination with each of said plates, of a pivotal link mounted on a frame member and extending into the path of travel of each of said plates and adapted to engage said plates in the vicinity of its pivot when said pusher is substantially midway of its non-advancing stroke; and means for preventing the pivoting of said link during the non-advancing stroke of said pusher.

ARTHUR M. PERRIN.

References Cited in the file of this patent

UNITED STATES PATENTS

| Number | Name | Date |
|---|---|---|
| 134,056 | Havens | Dec. 17, 1872 |
| 684,062 | Howard | Oct. 8, 1901 |
| 704,540 | Hill | July 15, 1902 |
| 1,426,648 | Johns | Aug. 22, 1922 |
| 2,381,185 | Rogers et al. | Aug. 7, 1945 |
| 2,533,676 | Matthews et al. | Dec. 12, 1950 |

FOREIGN PATENTS

| Number | Country | Date |
|---|---|---|
| 432,879 | Great Britain | Aug. 6, 1935 |